Oct. 19, 1943.   V. E. CARBONARA   2,332,297
REMOTELY INDICATING COMPASS
Filed Feb. 20, 1941   3 Sheets-Sheet 1

INVENTOR
VICTOR E. CARBONARA
BY his ATTORNEY

Oct. 19, 1943.   V. E. CARBONARA   2,332,297
REMOTELY INDICATING COMPASS
Filed Feb. 20, 1941   3 Sheets-Sheet 2

INVENTOR
VICTOR E. CARBONARA
BY
his ATTORNEY

Oct. 19, 1943.    V. E. CARBONARA    2,332,297
REMOTELY INDICATING COMPASS
Filed Feb. 20, 1941    3 Sheets-Sheet 3

INVENTOR
VICTOR E. CARBONARA
BY
his ATTORNEY

Patented Oct. 19, 1943

2,332,297

UNITED STATES PATENT OFFICE 2,332,297

REMOTELY INDICATING COMPASS

Victor E. Carbonara, Manhasset, N. Y., assignor to Square D Company, Detroit, Mich., a corporation of Michigan Application February 20, 1941, Serial No. 379,809

5 Claims. (Cl. 177—351)

This invention relates to improvements in remotely indicating systems and has for its object, broadly, the provision of a multiple remote indicator selectively operable from a plurality of transmitters and readable without ambiguity.

This object may be illustrated by a specific application which this invention has to the art of navigation.

A craft such as, for example, an airplane is normally steered according to the indications of a directional instrument such as a compass or a gyroscope.

Under certain conditions, however, it becomes necessary that the craft be steered according to factors other than azimuthal direction. To the pilot of a bombing plane, for example, the compass course is only of interest until the plane has reached the vicinity of the target to be bombed. From then on the actual compass course is of little interest and the pilot has to steer the plane according to instructions from the bombardier. These instructions may be given automatically according to the adjustment of a bomb sight directed by the bombardier on the target and visibly indicated to the pilot on the instrument panel.

There may for this purpose be provided on the instrument panel a deviation from course indicator indicating in which direction the course of the craft has to be altered in order to approach the target in the proper direction. In the neighborhood of the target the pilot thus has to disregard the indications of the compass and follow the visual directions given through the deviation from course indicator.

Aside from the disadvantage of requiring two different instruments on the already crowded instrument panel, the presence of two instruments is likely to lead to ambiguity in the indication and resulting confusion of the pilot.

It is, therefore, an object of this invention to provide for this specific and other comparable uses a remote indicator selectively operable by a plurality of transmitters.

Returning to the specific example, it is thus an object of the invention to provide a direction indicator selectively operable from the transmitter of a remote compass or directional gyroscope or from the transmitter coupled to a bomb sight.

It is a further object of the invention to provide in a common remote indicator for use in connection with a plurality of transmitters, a plurality of indicating elements, preferably one for each transmitter, together with means for visually distinguishing between the several indicating elements.

In carrying out this object, the invention aims at providing as a particularly simple and inexpensive embodiment, a remote indicator having a plurality of dials only one of which cooperates with the pointer at a time, thereby eliminating ambiguity in the reading of the indicator.

The invention further aims at providing a remote indicator for use with a plurality of transmitters in which one of a plurality of indicating elements is rendered visible automatically upon actuation of the corresponding transmitter.

The invention further aims at providing a remote indicator selectively actuable by a first transmitter operated by alternating current and a second transmitter operated by direct current.

The invention further aims at providing means for selectively connecting a remote indicator having a plurality of indicating elements to one of a plurality of transmitters upon rendering visible the indicating element associated with that transmitter.

Further aims, objects and advantages of this invention will appear from a consideration of the description which follows with accompanying drawings showing for purely illustrative purposes embodiments of this invention. It is to be understood, however, that the description is not to be taken in a limiting sense, the scope of the invention being defined in the appended claims.

Referring to the drawings:

Fig. 1 is a wiring diagram illustrating the manner of selectively connecting a common receiver to an alternating current and a direct current transmitter;

Fig. 2 is a diagrammatic illustration of a remote transmission unit which may be used as an A. C. transmitter or receiver or as a D. C. receiver;

Figure 1:
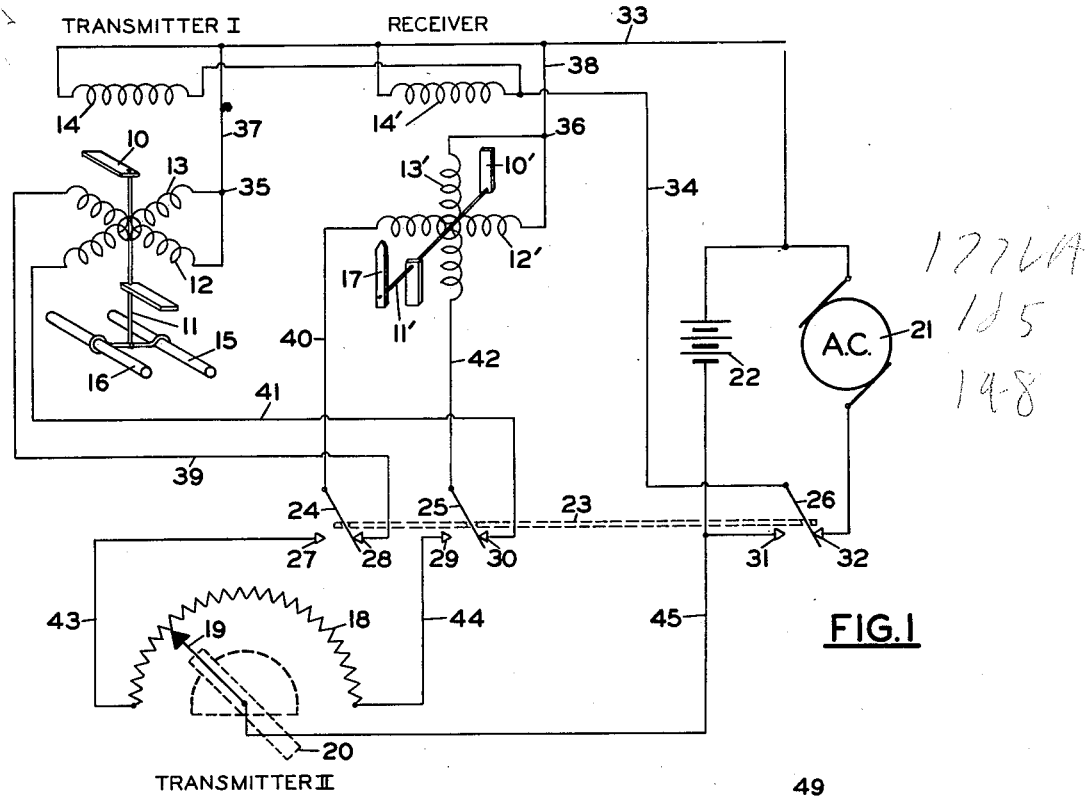

Referring to Fig. 1, an A. C. transmitter is shown as comprising a movable Z-shaped armature 10 having a shaft 11. The armature is movable within a field created by field coils 12 and 13. The armature 10 is polarized by means of a polarizing winding 14 and adjusted in azimuth by a direction maintaining element shown, in the illustrated example, in the form of a pair of permanent magnets 15 and 16.

The common receiver is of similar structure as the transmitter. Primed reference numerals are, accordingly, used to identify corresponding elements.

The receiver is mounted with its armature shaft 11' in a horizontal position moving a pointer 17 in a substantially vertical plane. The armature 10' of the receiver may again be of Z-shape movable within a field of coils 12' and 13' and polarized by means of a polarizing winding 14'.

Figures 2, 3:
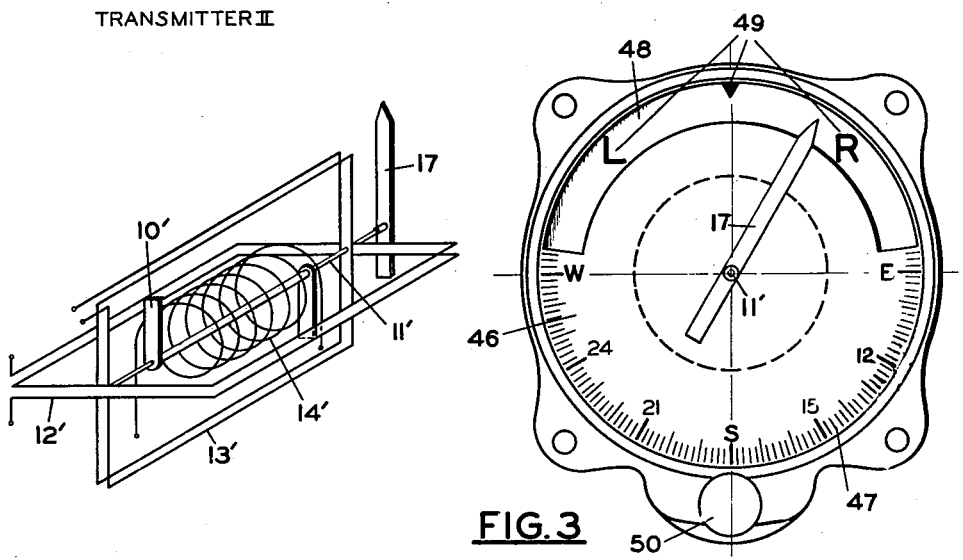
Fig. 3 is a front view of a form of remote indicator according to this invention.

The actual arrangement of the elements of the transmitter and receiver is perspectively illustrated in Fig. 2 showing the field coils 12' and 13' arranged at right angles to each other and to the shaft 11' of the armature 10'. The polarizing coil 14' is coaxially arranged with respect to the armature shaft.

A source of alternating current connected to the terminals of the polarizing winding 14' will cause the armature vanes forming the Z-structure with the shaft 11 to change their polarity with each cycle of the alternating current thus causing the armature to assume a position relatively to the field coils 12' and 13' depending on the direction of the resulting magnetic field created by said field coils.

This form of transmitter and receiver is disclosed in the patent to Paul Kollsman No. 2,239,790 dated April 29, 1941.

Returning to Fig. 1, a second transmitter operable by direct current is shown in the form of a potentiometer comprising a resistor 18 and a movable contact 19. The movable contact is adjusted relatively to the resistor in dependence on the direction of a controlling element such as a sight 20.

Sources of alternating and direct current are shown as an A. C. generator 21 and a battery 22 connectible to the respective transmitter and receiver by means of a common multiple switch 23. The switch has movable contacts 24, 25 and 26 cooperating with fixed contacts 27, 28; 29, 30; and 31, 32 respectively.

In the position shown in Fig. 1, the receiver is connected to transmitter I and supplied with alternating current from the generator 21. The polarizing windings 14 and 14' are connected in parallel across the terminals of the generator. A first supply lead 33 leads to the one terminal of the polarizing windings 14, 14' while a return lead 34 connects the remaining terminals of the polarizing windings with the other terminal of the generator through switch contacts 26 and 32.

The alternating current flowing through the polarizing windings 14, 14' will thus cause the armatures 10 and 10' to change their polarity with each cycle of the A. C. The armature 14 will thus induce an E. M. F. in the field windings 12 and 13 depending on the relative position between the armature and the field windings.

The transmitter field windings are connected in parallel to the corresponding field windings in the receiver in which thus a resultant magnetic field is set up moving the receiver armature 10' into the same position which the transmitter armature occupies with respect to its associated field windings.

The field windings 12 and 13 of the transmitter are interconnected at 35. The corresponding field windings 12' and 13' of the receiver are interconnected at 36. Conductors 37 and 38 lead from the connecting points 35 and 36 to the lead 33. The remaining terminal of the field winding 12 is connected to the corresponding terminal of the field winding 12' of the receiver through lead 39, contacts 28, 24 and lead 40.

The remaining terminal of the field winding 13 is connected to the second terminal of the corresponding receiver winding 13' through lead 41, contacts 30, 25 and lead 42.

With the multiple switch 23 in the position as it is shown in Fig. 1, the transmitter and receiver are connected in parallel and the armature of the receiver will repeat the position of the armature of the transmitter. Equipped with a compass dial, the pointer 17 will thus indicate at a remote point the position of the directional element 15, 16.

If the receiver is to be operated from the second transmitter, for example, for the purpose of steering the craft according to the position of a sighting device 20 rather than the compass course, the multiple switch 23 is moved into the other position thereby disconnecting the field windings 12 and 13 of the first transmitter from the corresponding field windings 12' and 13' of the receiver by opening contacts 24, 28 and 25, 30. The movable contacts 24 and 25 are now connected to leads 43 and 44 at fixed contacts 27 and 29 respectively. The leads 43 and 44 are connected to the terminals of the resistor 18. The movable contact 19 adjustable in dependence on the position of the sighting device 20 is connected to the battery 22 through a lead 45.

By the same movement of the switch 23, the generator 21 is disconnected from the receiver and first transmitter by opening contacts 26 and 32. In its place, the battery 22 is connected in the circuit by closing contacts 26 and 31. The polarizing winding 14' of the receiver is thus supplied with direct current from the battery 22 through leads 33 and 34. The polarized armature 10' will now assume a position relatively to the field windings 12', 13' depending on the strength of the magnetic fields set up by each field winding.

If the movable contact 19 of the potentiometer is moved to the left, the strength of the magnetic field of the field coil 12' will reach a maximum while at the same time the strength of the field coil 13' will be at a minimum. The armature 10' will, accordingly, be moved into a position in which its poles are aligned with the poles of the coil 13'.

If the movable contact 19 is moved into the opposite extreme position, the strength of the field winding 13 will reach a maximum and the strength of the field winding 12' will reach a minimum. The armature will thus assume a position differing 90° from the previously described position.

If the movable contact 19 is in a center position, field windings 12' and 13' will set up magnetic fields of equal strength thereby causing the armature to assume a 45° position with respect to each field winding.

In Fig. 3 a suitable form of dial for the receiver is illustrated. The dial consists of two portions, a permanent portion 46 shown as bearing directional graduations 47 and an interchangeable portion 48 bearing on its visible portion deviation from course markings 49 and on its concealed portion directional graduations for completing the directional graduations of the dial 46 to form a 360° dial. Correct course is indicated by a position of the pointer opposite the center marking 49. This position of the pointer corresponds to a position of the movable contact 19 of transmitter II in the center of the resistor 18.

By operating a knob 50 switching means corresponding to switch 23 may be actuated and the dial portion 48 interchanged. This may be accomplished by rotating the dial portion 48 to become invisible while rendering visible the concealed portion which contains the portion missing on the compass dial 46. Various forms of mechanism may be employed for this purpose.

The patent to Abrahamson No. 2,103,606 dated December 28, 1937 illustrates one form of multiple dial which may be used for devices in which more than two transmitters are used for actuating a common receiver.

Figure 4:
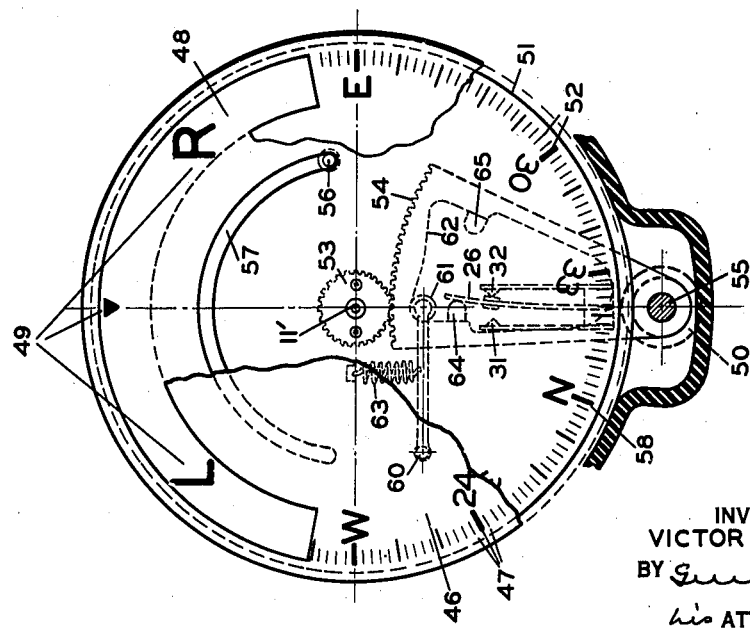
Fig. 4 is a front view of a multiple dial and actuating means for manually interchanging the dials.

A simple and inexpensive form of mechanism for use in an installation having two transmitters is illustrated in Fig. 4. In this embodiment the carrier for the interchangeable dial is a disk 51 carrying both the deviation from course markings 49 and a further dial portion 52 for completing the graduations 47 to form a 360° dial. The disk 51 is rotatable concentrically with the pointer shaft 11' by means of a pinion 53 meshing with a toothed sector 54. The sector 54 is mounted on a shaft 55 of the knob 50. A rotation of the knob 50 in counterclockwise direction will cause a movement of the disk 51 in clockwise direction.

This movement is limited by a fixed stop 56 cooperating with a slot 57 in the disk. The stop is so adjusted that in one end position of the disk 51, the center mark 49 and in the other position the zero mark 58 of the compass dial appears vertically above the pointer shaft. Means may be provided by biasing the movable dial carrier towards one or the other of its end positions.

In the illustrated embodiment, a lever 59 is shown pivoted at one end at 60 and carrying a roller 61 at the other end. The roller bears against an inclined race 62 of the sector and tends to maintain the sector in one or the other of the end positions under the force of a spring 63.

Switching means may be associated with the dial changing means for connecting to the receiver the transmitter corresponding to the interchangeable dial portion visible at the time.

In the illustrated embodiment, the switch is shown as including three aligned flexible springs, the top-most one being visible at 26. The springs cooperate with three pair of aligned make-contacts, one pair being visible at 31 and 32. The contact springs are actuated by means of insulating studs 64 and 65.

Instead of, or in addition to, manual interchanging means for the dials and switching means, automatic means may be provided for performing these operations.

Figure 5:
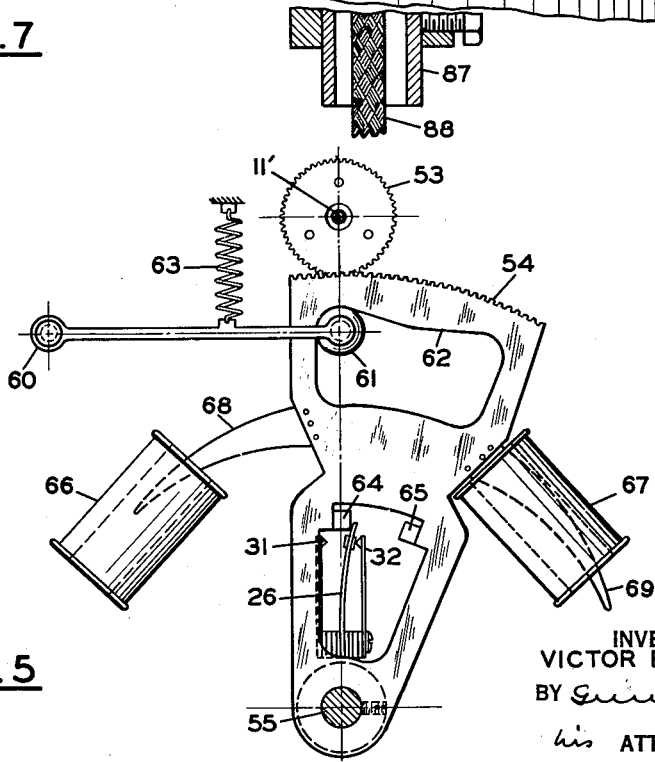
Fig. 5 shows elements of the device of Fig. 4 modified for remote actuation.

In Fig. 5 a pair of electromagnets 66 and 67 are shown cooperating with soft iron cores 68 and 69. The soft iron cores are mounted on the arms of the toothed sector 54. In the illustrated position the electromagnet 67 was last energized, thereby moving the sector 54 to the right and closing contact 26, 32 while breaking the contact 26, 31 (Fig. 4).

Figure 6:
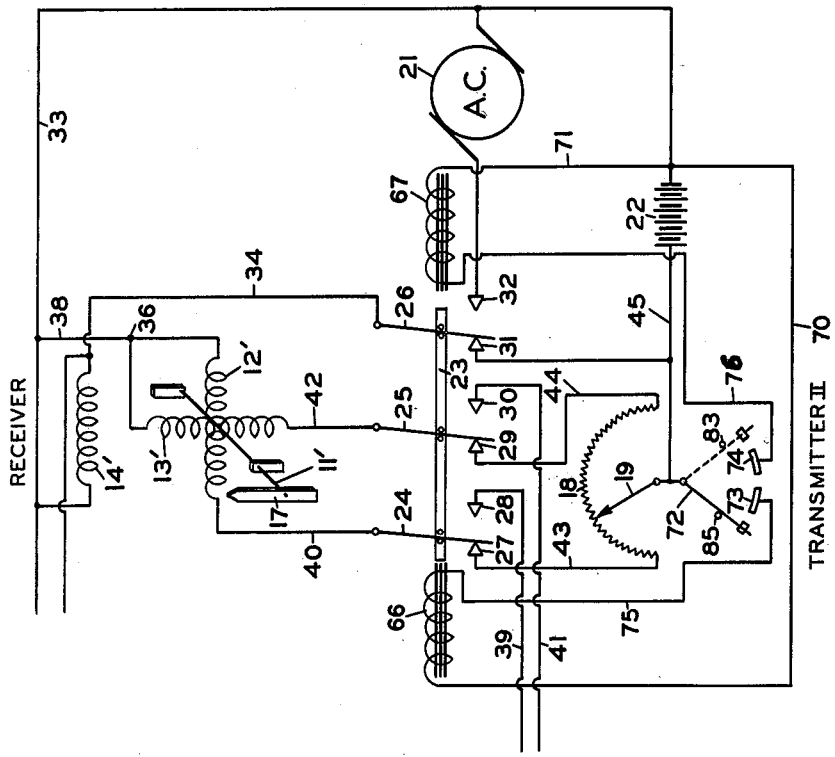
Fig. 6 is a diagram illustrating automatic switching means for connecting the common receiver to one or the other of a pair of transmitters.

The automatic switching and dial interchanging means may be connected to be automatically operated whenever an actuating device for the second transmitter is brought into operation or returned to an inoperative position. A circuit for performing this operation is shown in Fig. 6.

The electromagnets 66 and 67 for interchanging the dials and actuating the switching means are connected through leads 70 and 71 respectively to one terminal of the battery 22. The other terminal of the battery is connected to a movable contact 72 cooperating with contact segments 73 and 74. Contact segment 73 is connected to the other terminal of electromagnet 66 through a lead 75 while segment 74 is connected to the second terminal of the electromagnet 67 through a lead 76.

The contact arm 72 is normally in an inoperative position, shown in dotted lines, without making contact with either of the segments 73 and 74. Into this position the arm was moved after last making contact with segment 74 thereby energizing electromagnet 67 and moving the switch into a position in which transmitter I (Fig. 1) is connected to the receiver.

If the actuating device to which transmitter II is connected is brought into use, the contact arm 72 is moved in succession over segments 74 and 73. This movement of the contact arm causes electromagnet 67 to be energized first without a resulting change in the dial and switch settings. Upon further movement, the contact arm 72 makes contact with segment 73, thereby energizing electromagnet 66 and putting the switch 23 into the position in which it is shown in Fig. 6. In this position the transmitter II is connected with the receiver. Simultaneously the dials of the transmitter are interchanged as shown in Fig. 5.

While the actuating device of transmitter II is in operation, the contact arm 72 remains in the position in which it is shown in solid lines in Fig. 6. When the actuating device is returned to its inoperative position, the arm 72 moves in succession over contact segments 73 and 74, thereby last energizing electromagnet 67 and restoring the dial and switch setting for transmitter I.

Figure 7:
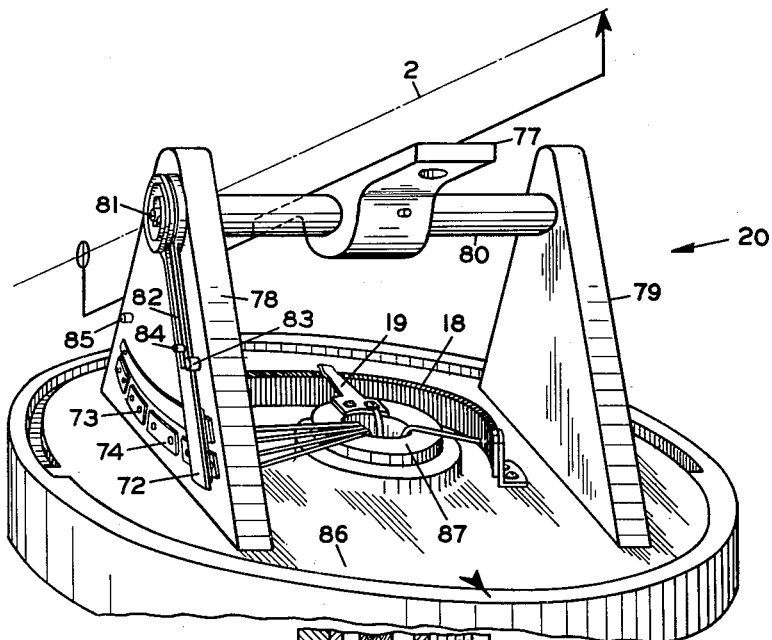
Fig. 7 is a perspective view of a D. C. transmitter incorporated in a sighting device.

Fig. 7 shows a support for a sighting device in which the switch 72, 73, 74 is incorporated. The sight (not illustrated in detail but represented by an axis 2) is mounted on a bracket 77 pivoted in supports 78 and 79 on a shaft 80. To the reduced end 81 of the shaft 80 extending through the support 78, the contact arm 72 is mounted with freedom of movement relatively to the shaft. A spring 82 resiliently connects the contact arm with the shaft 80 and maintains the arm in one end position against a stop 83 as long as the sighting device is not in use. One end of the spring extends through a hole in the reduced end 81 of the shaft 80. The other end of the spring is secured to the arm 72 at 84.

The sighting device is brought into operation by tilting it about the axis of the shaft 80 thereby moving the contact arm 72 through the spring 82 over segments 74 and 73 into the other end position against a stop 85. After use the sighting device is permitted to tilt back into the position in which it is shown in Fig. 7 and the arm 72 returns to the illustrated position in which it rests against stop 83, thereby restoring the condition in which the receiver is connected to transmitter I and the compass dial completed by rotation of the dial carrier in a manner hereinbefore disclosed.

A movement of the sight in azimuth causes a rotation of the supports 78 and 79 together with their base plate 86 to which a transmitter may be connected.

In the illustrated embodiment, the base plate 86 carries the resistor 18. The base plate 86 rotates about a hollow central post 87 through which the cable connection 88 is shown to extend. The movable arm 19 of the transmitter is connected to post 87 thereby moving relatively to the resistor 18 in dependence on the azimuthal position of the sight.

Obviously, the present invention is not restricted to the particular embodiments shown and described. Other forms of transmitters and repeaters may be used and other forms of dial changing and switching means be employed without departing from the spirit of this invention. Further this invention is not restricted to the described specific application to aircraft instruments. It is also not indispensable that all the features of this invention be used conjointly since they may advantageously be employed in various combinations and subcombinations.

In the claims the term "rotatable armature" is employed to define an armature capable of making complete rotations in distinction from armatures having limited freedom of movement of less than 360°.

What is claimed is:

1. A remotely indicating system comprising, in combination, a first transmitter; a first element movable in dependence on the magnitude of a condition and connected to actuate said first transmitter; a second transmitter; a second element movable in dependence on the magnitude of a condition and connected to actuate said second transmitter, said second element being movable from an inoperative position into an operative position; a switch actuated in response to the movement of said second element from said one position into the other; a receiver; a circuit connecting said transmitters with said receiver, said circuit including switching means for alternately connecting one or the other of said transmitters to said receiver; indicating means operable by said receiver, said indicating means including interchangeable indicating elements; and means controlled by said switch for jointly actuating said switching means and interchanging said indicating elements.

2. A remotely indicating system comprising, in combination, a first transmitter; a first element movable in dependence on the magnitude of a condition and connected to actuate said first transmitter; a second transmitter; a second element movable in dependence on the magnitude of a condition and connected to actuate said second transmitter, said second element being movable from an inoperative position into an operative position; a switch actuated in response to the movement of said second element from said one position into the other; a receiver; a circuit connecting said transmitters with said receiver, said circuit including switching means for alternately connecting one or the other of said transmitters to said receiver; indicating means operable by said receiver, said indicating means including interchangeable dials; a magnetic power means controlled by said switch, said power means being connected to actuate said switching means and to interchange said dials.

3. A remotely indicating system comprising, in combination, an A. C. transmitter including a plurality of field windings, a Z-shaped armature rotatable relatively to said windings, and an energizing winding for polarizing said armature; a first element movable in dependence on the magnitude of a condition and connected to actuate said A. C. transmitter; a D. C. transmitter; a second element movable in dependence on the magnitude of a condition and connected to actuate said D. C. transmitter, said second element being movable from an inoperative position into an operative position; a switch actuated in response to the movement of said second element from said one position into the other; a receiver including a plurality of field windings, a Z-shaped armature rotatable relatively to said windings, and an energizing winding for polarizing said receiver armature; a circuit connecting said transmitters with said receiver, said circuit including sources of A. C. and D. C. and switching means for connecting one or the other of said transmitters to said receiver; indicating means operable by said receiver, said indicating means including interchangeable indicating elements; means for interchanging said indicating elements; and power means controlled by said switch for jointly actuating said switching means and interchanging said indicating elements.

4. A remotely indicating system comprising, in combination, an A. C. transmitter including field windings and having an armature capable of rotating through 360° relative to said field windings and a winding for polarizing said armature; a D. C. transmitter having an armature capable of rotating through 180°; a receiver including field windings and having an armature capable of rotating through 360° relative to its field windings and a winding for polarizing said receiver armature; a circuit connecting said transmitters with said receiver, said circuit including sources of A. C. and D. C. and switching means for alternately connecting one or the other of said transmitters and the corresponding source to said receiver; indicating means operable by said receiver, said indicating means including two scales one of which is a scale of substantially 180° corresponding to the armature rotation of said D. C. transmitter and the other is a scale of 360°, said 180° scale being complementary to the other scale thereby constituting a scale of 360° corresponding to the armature rotation of said A. C. transmitter; and manual operating means for jointly actuating said switching means and interchanging said scales.

5. A remotely indicating system comprising, in combination, an A. C. transmitter including a plurality of field windings, a Z-shaped armature capable of making complete rotations through 360° relatively to said windings, and an energizing winding for polarizing said armature; a D. C. transmitter having an armature capable of making a rotation through 180°; a receiver including a plurality of field windings, a magnetizable Z-shaped armature capable of making complete rotations through 360° relatively to said windings, and an energizing winding for polarizing said armature; a circuit connecting said transmitters with said receiver, said circuit including sources of A. C. and D. C. and switching means for connecting one or the other of said transmitters and the corresponding source to said receiver; indicating means operable by said receiver, said indicating means including two scales one of which is a scale of substantially 180° corresponding to the armature rotation of said D. C. transmitter and the other is a scale of 360°, said 180° scale being complementary to the other scale thereby constituting a scale of 360° corresponding to the armature rotation of said A. C. transmitter; means for interchanging said scales; and operating means for jointly actuating said switching and said interchanging means.

VICTOR E. CARBONARA.